Sept. 18, 1962 J. J. TOROK 3,054,220
PLUNGER FOR FORMING GLASS ARTICLES
Filed Sept. 25, 1958 2 Sheets-Sheet 1

INVENTOR.
JULIUS J. TOROK
BY W. A. Schaich
& E. J. Holler
ATTORNEYS

Sept. 18, 1962 J. J. TOROK 3,054,220
PLUNGER FOR FORMING GLASS ARTICLES
Filed Sept. 25, 1958 2 Sheets-Sheet 2

INVENTOR.
JULIUS J. TOROK
BY W. A. Schaich
& E. J. Holler
ATTORNEYS

United States Patent Office 3,054,220
Patented Sept. 18, 1962

3,054,220
PLUNGER FOR FORMING GLASS ARTICLES
Julius J. Torok, Toledo, Ohio, assignor to Kimble Glass Company, a corporation of Ohio
Filed Sept. 25, 1958, Ser. No. 763,384
13 Claims. (Cl. 49—68)

This invention relates to the forming of glass articles and particularly to glass articles having a base and a flange extending around the periphery of the base and forming an angle therewith.

In making of glass articles, such as the base plates of television tubes and glass block halves which have a base and a flange extending around the periphery of the base and forming an angle with the base, a gob of glass is placed in a mold having an internal molding surface corresponding to the external configuration of the article which is to be formed and a plunger is moved downwardly to press and form the glass. The plunger has an external molding surface corresponding to the internal configuration of the glass article which is to be formed.

In the making of glass articles in accordance with such a method it is essential that the forming surfaces of the mold and the plunger be maintained within predetermined temperatures. If the forming surfaces have too high a temperature the glass will stick. This will necessitate a stoppage of the forming equipment in order to repair the damage caused by sticking. If the glass-forming surfaces are at too low a temperature, a crizzle or wrinkle will be formed in the glass article. Either of these conditions is obviously undesirable and it is necessary that the glass-forming surfaces be operated at temperatures between the two extremes in order that glass articles may be successfully formed at low cost.

In making a glass article such as television tube faces or glass block halves which have a base and a flange, the problem of maintaining the forming surfaces between predetermined working temperatures is more difficult than in articles which are generally flat because there is a tendency for some areas of the forming surfaces to be too hot and the other areas to be too cold.

It is an object of this invention to provide a novel apparatus for forming articles having a base and a peripheral flange wherein the forming surfaces of the plunger will be maintained at optimum working temperatures.

Figure 1:
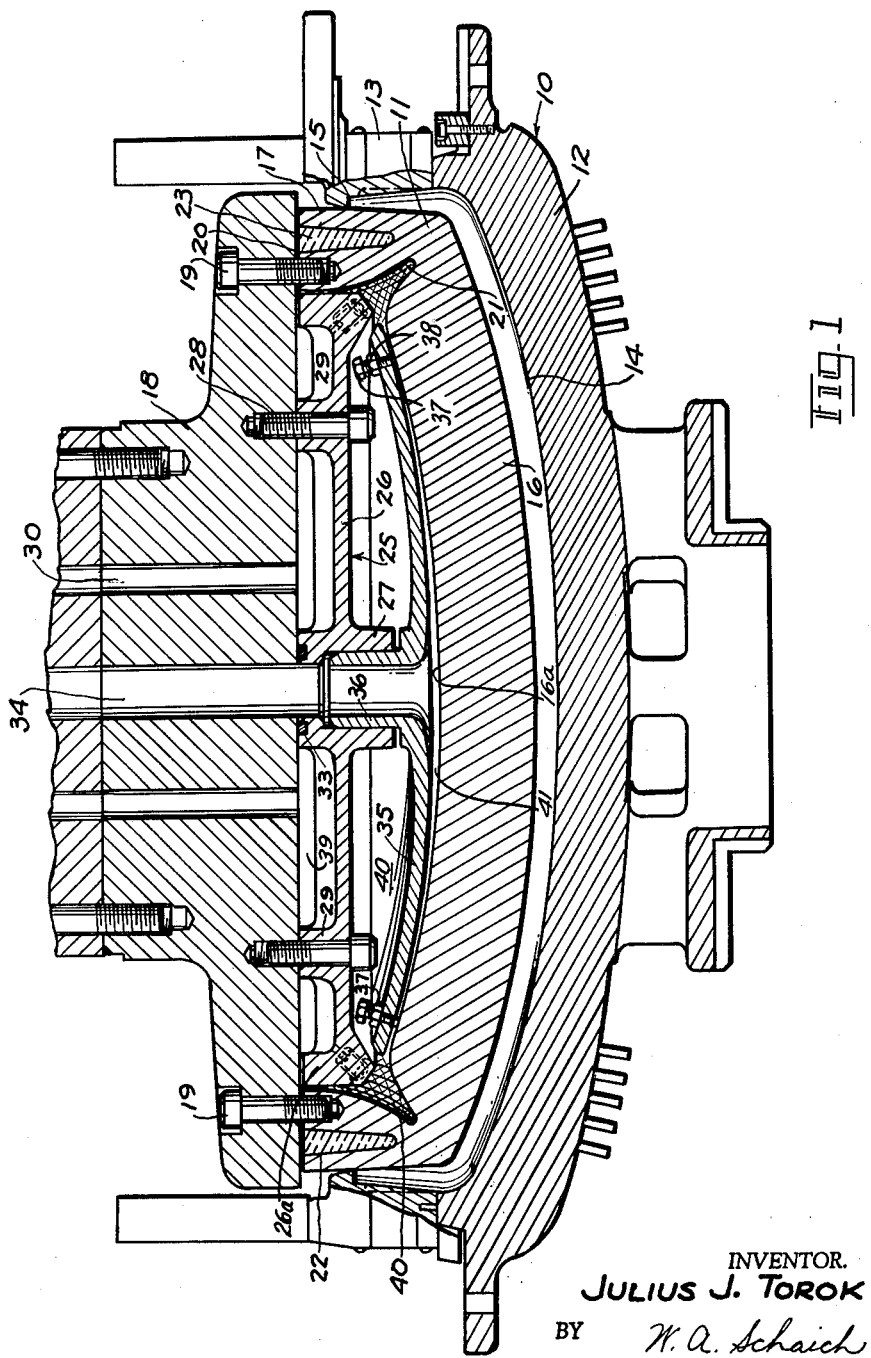
FIG. 1 is a sectional elevational view of a glass-forming apparatus embodying the invention.

Referring to FIG. 1, a mold 10 is provided into which a gob of glass is deposited by suitable means well known in the art and thereafter plunger 11 is brought downwardly into contact with the glass to press and form the glass article.

As shown in FIG. 1, mold 10 comprises a base section 12 and a peripheral section 13 defining an internal molding surface 14 which has a configuration corresponding to the external configuration of the glass article which is to be formed. Peripheral section 13 includes an inwardly extending peripheral lip 15 which defines the upper end of the flange which is to be formed on the glass article.

Plunger 11 includes a base portion 16 and a flange portion 17 and is mounted on a head 18 by bolts 19 threaded into flange portion 17 of the plunger 11. A gasket 20 is interposed between the upper end of flange portion 17 of plunger 11 and head 18. Head 18 is adapted to be moved upwardly and downwardly by a suitable mechanism (not shown) in the art such as a hydraulic ram.

The specific construction of plunger 11 may vary but preferably is of the type disclosed and claimed in my copending application, Serial No. 763,351, titled "Forming Glass Articles," filed on the same date as the present application. Such a plunger 11 includes a base portion 16 of substantially uniform thickness and flange portion 17 extending around the periphery of said base portion and forming an angle not exceeding 90° thereto. A peripheral groove 21 is provided in the area of juncture of the base portion 16 and flange portion 17 on the side of the plunger opposite the molding surface. In addition, a slot 22 is provided in the upper end of flange portion 17. Slot 22 is preferably filled with an insulating material 23 such as asbestos.

According to the invention, liquid coolant is directed against the base of groove 21 at the area of juncture of base portion 16 and flange portion 17 and a rotary motion is imparted to the liquid coolant. In addition, the liquid coolant is guided at a uniform rate along the surface of base portion 16 opposite the molding surface of the plunger from the periphery toward the center and is thereafter removed from the plunger.

Figure 2:
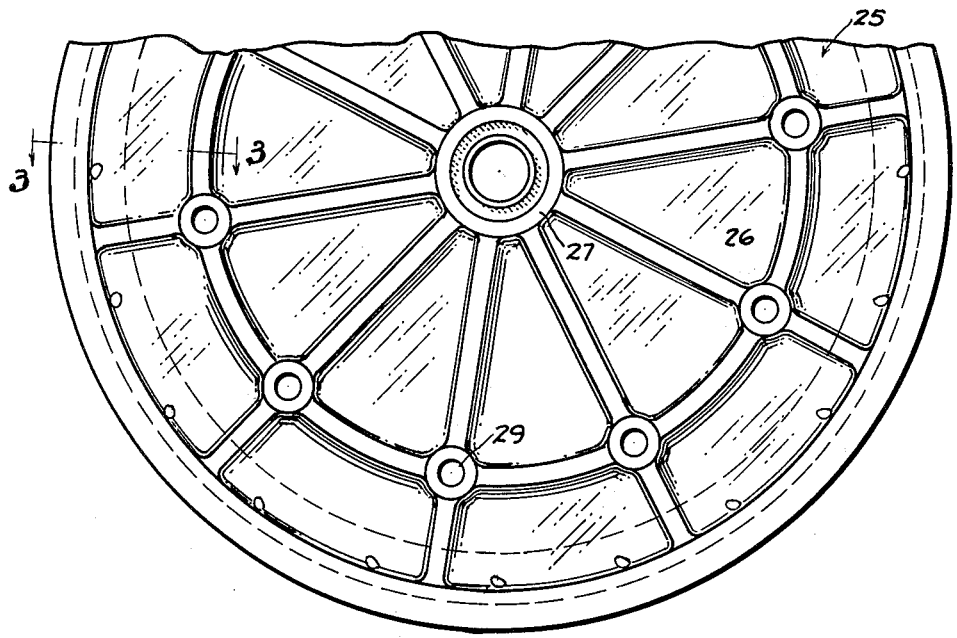
FIG. 2 is a plan view of a portion of the apparatus shown in FIG. 1.
Figures 3, 4:
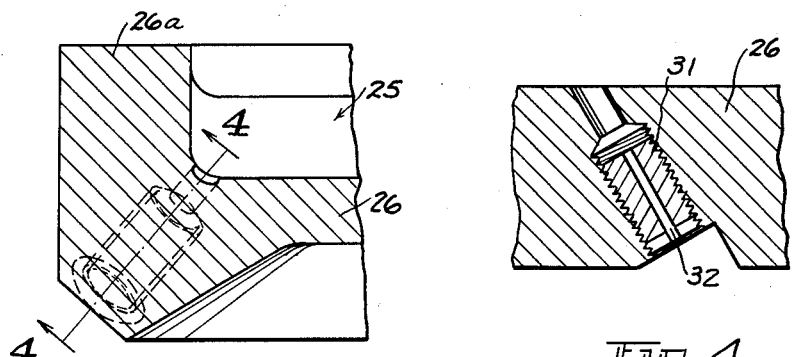
FIG. 3 is a fragmentary sectional view taken along the line 3—3 in FIG. 2.
FIG. 4 is a fragmentary sectional view taken along the line 4—4 in FIG. 3.

As shown in FIGS. 1 and 2, a distributor 25 is provided between head 18 and plunger 11 and comprises a circular plate 26 and a hub 27 at the center of the plate. Bolts 28 extend through circumferentially spaced bosses 29 to support distributor 25 on the lower end of head 18. A lip 26a is formed on the periphery of plate 26 and extends upwardly into contact with gasket 20. Liquid coolant is forced under pressure through circumferentially spaced vertical openings 30 in head 18 into the space 39 between plate 26 and lower end of the head. A plurality of nozzles is provided in the periphery of the distributor. Each nozzle comprises a plug 31 threaded into an opening in the distributor. Each plug is formed with a nozzle opening 32 which has its axis inclined horizontally to a radial plane intersecting the axis of plunger 11. In this fashion a plurality of streams or jets of liquid coolant are directed at the area of juncture of the periphery of base portion 16 and flange portion 17 of plunger 11, that is, into groove 21. An O-ring type gasket 33 is provided on the upper end of hub 27 to provide a seal and prevent the liquid coolant from passing from the inlet directly to the outlet opening 34 in head 18.

A disc 35 is provided below distributor 25 and includes a sleeve 36 extending upwardly into hub 27. The upper end of sleeve 36 is spaced from the base of the opening of the hub in which it extends so that disc 35 has limited reciprocating movement relative to hub 27 and, in turn, distributor 25. Screws 37 are provided at circumferentially spaced points along the periphery of disc 35 and extends through the disc into contact with the inner surface of base portion 16. Screws 37 are locked in position by lock nuts 38. By this arrangement, the lowermost position of disc 35 is adjusted so that the disc is always out of contact with the inner surface of base portion 16.

In operation, gobs of glass are periodically fed to mold 14 and plunger 16 is moved downwardly into contact with each gob to form the glass article.

During the operation of the forming equipment, liquid coolant is forced under pressure through openings 30 into the space between the lower end of head 18 and distributor 25. Coolant is then directed in a plurality of streams or jets at the area of junction of the base portion 16 and flange portion 17. Since the axes of the jets are at an angle to a radial line intersecting the axis of the plunger, a rotary motion is imparted to the coolant. The liquid coolant fills the space 40 between the undersurface of plate 26 and the upper surface of disc 35 forcing disc 35 downwardly and bringing the ends of bolts 37 into contact with the inner surface 16a of base portion 16. The restricted flow through space 41 between disc 35 and base portion 16 causing a small pressure drop which produces a differential pressure between the space 40 and the space 41 insuring that the disc 35 is urged downwardly into proper position with respect to the surface 16a.

The undersurface of disc 35 is so shaped relative to the surface of base portion 16 of plunger 11 that the liquid, as it flows from the periphery of the base portion to the center thereof, flows at a constant velocity. In other words, the cross-sectional area of the space 41 between the lower or undersurface of disc 35 and the inner surface of base portion 16 is such that it increases in size from the periphery to the center so that a constant velocity of liquid will be permitted to flow. The cooling effect is determined by the velocity of flow and not by the prescribed rate or volume of flow. The liquid coolant is withdrawn through sleeve 35 and outlet 34.

The surface of the plunger 16 against which the cooling is directed is preferably roughened in order to obtain the best possible heat transfer. The roughening may be achieved by knurls 40 or in any other suitable manner such as ribs. The roughening should be sufficient to insure heat transfer but not so deep as to form stagnant pockets of cooling.

By this arrangement, a uniform cooling of the base portion 16 of the plunger is achieved from the periphery to the center thereof. At the same time, since the liquid coolant at the lower inlet temperature first strikes the plunger at the area of juncture of base portion 16 and flange portion 17, a greater cooling action is achieved in that area where the temperature is normally higher so that an overall isothermal temperature condition is provided for the molding surfaces of the plunger.

Although the appartaus has been described in connection with a circular article or a circular mold and plunger, it should be apparent that it is also applicable to articles which are of rectangular or other cross section. For example where the object being formed is rectangular the nozzles are so positioned as to provide a uniform velocity of flow. In order to obtain the beneficial results, the design of the apparatus should be such that there is the same resistance to flow of the coolant throughout all sections of the cooling cavity thereby insuring a uniform velocity of flow of the coolant.

In addition to providing a substantially isothermal operation of the molding surfaces of the plunger, the arrangement shown and described permits an easy access to the parts thus facilitating maintenance of the apparatus.

I claim:

1. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising means adjacent the inner surface of the plunger for directing coolant on the inner surface of the plunnger at the area of juncture of the base portion and flange portion of the plunger and thereby imparting a rotary motion to the coolant about the axis of the plunger, means adjacent the inner surface of the plunger for guiding the movement of the liquid coolant in a layer over the inner surface of the base portion of the plunger at a substantially uniform velicity, and means for withdrawing the coolant from a point adjacent the center of the plunger.

2. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising means adjacent the inner surface of the plunger for directing liquid coolant on the inner surface of the plunger at the area of juncture of the base portion and flange portion of the plunger and simultaneously imparting a rotary motion to the coolant about the axis of the plunger, means adjacent the inner surface of the plunger for guiding the movement of the liquid in a continuous layer over the inner surface of the base portion of the plunger, and means for withdrawing the coolant from a point adjacent the center of the plunger.

3. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising means adjacent the inner surface of the plunger for directing a plurality of streams of liquid coolant on the inner surface of the plunger at the area of juncture of the base portion and flange portion of the plunger, and at an angle to a radial plane intersecting the axis of the plunger, means adjacent the inner surface of the plunger for guiding the movement of the liquid coolant in a continuous layer over the inner surface of the base portion of the plunger, and means for withdrawing the coolant from the point adjacent the center of the plunger.

4. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising means adjacent the inner surface of the plunger for directing coolant on the inner surface of the plunger at the area of juncture of the base portion and flange portion of the plunger and thereby imparting a rotary motion to the coolant about the axis of the plunger, means adjacent the inner surface of the plunger for guiding the movement of the liquid coolant in a layer over the inner surface of the base portion of the plunger at a uniform velocity, said latter means including a surface spaced from the inner surface of the base portion and defining a passageway from the periphery of the plunger to the center of the plunger having gradually increasing cross sections from the periphery of the plunger to the center of the plunger taken along axial planes of the plunger.

5. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising means adjacent the inner surface of the plunger for directing a plurality of jets of liquid coolant on the inner surface of the plunger at the area of juncture of the base portion and flange portion of the plunger and at an angle to a radial plane through the axis of the plunger such that a rotary motion about the axis of the plunger is imparted to the liquid coolant, a disc positioned adjacent the inner surface of the base portion of the plunger and having the configuration such that the liquid coolant is caused to flow in a layer along the inner surface of the base portion and at a substantially uniform velocity, said disc having an opening therethrough at the center of said plunger through which the liquid coolant may be withdrawn.

6. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising means adjacent the inner surface of the plunger for directing a plurality of jets of liquid coolant on the inner surface of the plunger at the area of juncture of the base portion and flange portion of the plunger and at an angle to a radial plane intersecting the axis of the plunger such that a rotary motion about the axis of the plunger is imparted to the liquid coolant, a disc positioned adjacent and in spaced relation to the inner surface of the base portion of the plunger, said disc having a configuration such that the cross sections of the space between the disc and the inner surface of the plunger taken on axial planes through the plungers are substantially uniform and have a gradually increasing area from the periphery of the disc to the center of the plunger, thereby causing the liquid coolant to flow in a layer at a substantially uniform velocity over the inner surface of the plunger, said disc having an opening at the center of the plunger through which the liquid coolant may be withdrawn.

7. The combination set forth in claim 6 wherein means are provided for adjusting the position of said disc relative to the plunger.

8. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, the combination comprising a distributor member for directing a plurality of jets of liquid coolant on the inner surface of the plunger at the area of juncture of the base portion and flange portion of the plunger and at an angle to a radial plane intersecting the axis of the plunger such that a rotary motion about the axis of the plunger is imparted to the liquid coolant, a disc positioned adjacent the inner surface of the base portion of the plunger, said disc having a configuration such that the space between the disc and the inner surface of the plunger has a gradually increasing axial cross-sectional area from the periphery of the disc to the center of the plunger, thereby causing the liquid coolant to flow in a layer at a substantially uniform velocity over the inner surface of the plunger, said disc having an opening at the center of the plunger through which the liquid coolant may be withdrawn.

9. The combination set forth in claim 8 wherein said distributor member includes a plurality of jet-forming openings which have their axes extending toward the area of juncture of the flange portion and base portion of the plunger and forming an angle with a radial plane intersecting the axis of the plunger, said distributor member including a supply chamber communicating with said jets, and means for supplying liquid coolant to said supply chamber.

10. The combination set forth in claim 8 wherein said disc is movable axially relative to said plunger, the upper face of said disc being spaced from the lower end of said distributor member whereby a pressure chamber is formed between the distributor member and the disc, the liquid coolant entering said chamber and urging said disc downwardly toward said plunger, and means for limiting the movement of said disc toward said plunger.

11. The combination set forth in claim 10 wherein said means for limiting the movement of said disc toward said plunger is interposed between said disc and said plunger.

12. In an apparatus for forming a glass article by pressing a plunger downwardly into contact with a gob of glass placed in a mold having an internal molding surface corresponding to the external configuration of the article which is to be formed, said plunger having an external molding surface corresponding to the internal configuration of the article which is to be formed and comprising a base portion and a flange portion extending upwardly from the periphery of said base portion, said plunger having an inner surface opposite said external molding surface, a vertically movable body, means for mounting said plunger on said body with the upper edge of the flange portion thereof in sealing engagement with said body, a distributor member, means for mounting said distributor member within said plunger on said body and in sealing engagement relative to said body, said distributor member including a supply chamber, said body having a supply passageway therein communicating with said supply chamber, a plurality of nozzles around the periphery of said distributor member having their inner ends communicating with the supply chamber in said distributor member, the axes of said nozzles being positioned to direct jets toward the area of juncture of said flange portion and base portion of the plunger and impart a rotary motion to said liquid coolant about the axis of the plunger, a disc member mounted on said distributor member for movement axially relative thereto, said disc member having the periphery thereof spaced from said distributor member thereby providing a pressure chamber between said distributor member and disc member, means for limiting the movement of said disc member toward the base portion of the plunger, said disc member having its lower surface adjacent the inner surface of the base portion of the plunger for guiding the movement of liquid coolant in a layer over the inner surface of the base portion of the plunger, and means in said disc member providing a passageway adjacent the center of the plunger for withdrawal of the liquid coolant.

13. The combination set forth in claim 12 wherein the configuration of the lower surface of said disc member is such that the axial cross section of the area between the disc member and the inner surface of said plunger increases gradually from the periphery of the disc to the center of the disc thereby providing a substantially uniform velocity of flow of the liquid coolant over the inner surface of the base portion of the plunger.

References Cited in the file of this patent

UNITED STATES PATENTS

| | | |
|---|---|---|
| 1,857,540 | Hardenberg | May 10, 1932 |
| 2,133,767 | Goodrich | Oct. 18, 1938 |
| 2,519,059 | MacConnell | Aug. 15, 1950 |
| 2,839,870 | Denman | June 24, 1958 |
| 2,882,647 | Tallent | Apr. 21, 1959 |